United States Patent [19]

O'Loughlin

[11] Patent Number: 5,140,602
[45] Date of Patent: Aug. 18, 1992

[54] PULSED POWER MODULATOR CIRCUIT FOR A Q-SWITCHED CHEMICAL LASER

[76] Inventor: James P. O'Loughlin, 7101 Hensch NE., Albuquerque, N. Mex. 87109

[21] Appl. No.: 133,988

[22] Filed: Dec. 16, 1987

[51] Int. Cl.$^5$ .................................................. H01S 3/00
[52] U.S. Cl. ........................................ 372/38; 372/89; 372/10; 372/37; 315/307
[58] Field of Search .................. 372/39, 10, 37, 89; 315/307

[56] References Cited

U.S. PATENT DOCUMENTS

| | | | |
|---|---|---|---|
| 3,213,281 | 10/1965 | Nedderman | 250/199 |
| 3,464,024 | 8/1969 | Bell et al. | 331/94.5 |
| 3,560,871 | 2/1971 | Chen | 331/94.5 |
| 3,564,258 | 2/1971 | Feingold | 250/199 |
| 3,681,710 | 8/1972 | Lary et al. | 331/94.5 |
| 4,267,526 | 5/1981 | McDermott et al. | 372/89 |
| 4,467,474 | 8/1984 | Davis et al. | 372/89 |
| 4,677,348 | 6/1987 | Schweickardt | 315/307 |

Primary Examiner—Leon Scott, Jr.

[57] ABSTRACT

A pulsed power modulator provides high current pulses having fast rise and fall times to the solenoid of a Q-switched chemical laser.

5 Claims, 4 Drawing Sheets

PULSED POWER MODULATOR CIRCUIT FOR A Q-SWITCHED CHEMICAL LASER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to pulse forming apparatus, and more particularly to a pulsed power modulator circuit for a repetitively pulsed chemical oxygen-iodine laser in which the threshold of the resonator is reduced by the incorporation therein of a scaleable intracavity gas phase Q-switch.

It is well recognized in the art that photochemical iodine lasers are capable of generating pulsed emission of very short duration and high energy. Examples of such photochemical iodine lasers can be found in the "Handbook of Chemical Lasers," edited by R. W. F. Gross and J. F. Bott, John Wiley and Sons, New York, 1976, chapter 12, pages 670–701. In the photochemical iodine laser the population inversion is produced in the flash photolysis of a parent alkyl-iodide, generally $C_3F_7$-I or $CF_3$-I. The iodine atom that is produced in the photolysis process is in the upper laser level, $^2P_{\frac{1}{2}}$.

High energy pulsed lasers of this type require large stores of electrical energy and generally operate at efficiencies of less than a few percent. In recent years a new type of iodine laser, the chemical oxygen iodine laser, COIL, has been under development. In this laser the population inversion is produced by energy transfer from excited molecular oxygen in the $O_2(^1\Delta)$ state. In the most recent development stages the emphasis has been placed on supersonic chemical oxygen iodine lasers. In the supersonic mode, thermally induced medium effects and their influence on beam quality are much smaller by comparison with subsonic operation. In subsonic operation of the COIL under loaded cavity conditions power extraction with its attendant heat release occurs so rapidly that unacceptable density variations are produced in the flow direction. Supersonic operation of COIL lasers, however, requires the generation and transport of $O_2(^1\Delta)$ at high pressure (>10 torr) which is difficult.

It is therefore highly desirable to be able to effectively utilize the low pressure generator technology and subsonic flow in chemical oxygen-iodine lasers in which the aerodynamic problems associated with supersonic flow would be much less critical.

U.S. patent application Ser. No. 785,186 entitled "REPETITIVELY PULSED Q-SWITCHED CHEMICAL OXYGEN-IODINE LASER" discloses an invention which overcomes the problems of severe flux induced density gradients in a continuous wave subsonic cavity of a chemical oxygen-iodine laser by operating the laser in a repetitively pulsed mode through the incorporation therein of a scaleable intracavity gas phase Q-switch. In this repetitively pulsed Q-switched chemical laser, the extraction volume defined by the resonator of the chemical oxygen-iodine laser is filled during the interpulse time with a thermally uniform gain medium. Once the optical mode volume is filled, laser action is triggered by reducing the threshold of the resonator with a scaleable intracavity gas phase Q-switch. For subsonic flow, cavity volumetric exchange times are on the order of milliseconds, whereas pulse extraction times due to the large magnitude of the $O_2(^1\Delta)/I$ transfer rate are on the order of microseconds. During the laser pulse, the medium is essentially stationary with temporal density variations caused by the flux induced temperature rise occuring uniformly over the optical aperture. Thus, by operating the laser at subsonic velocity in a repetitively pulsed mode the single most critical issue, that of medium quality and its effect on beam quality, is substantially reduced. In addition, the short duration, high intensity pulses produced in this particular mode of operation offers significant advantages in terms of propagation, target interaction effects, and the potential for frequency doubling when compared with lower average power CW operation.

The peak power enhancements in the repetitively pulsed mode of operation of the Q-switched chemical oxygen-iodine laser come about as a direct result of the relatively long radiative and collisional lifetimes of the $^2P_{\frac{1}{2}}$ state which permits and efficient accumulation of energy within the resonant cavity during the switch off portion of the cycle. The particular intracavity gas phase switch arrangement of this invention is based upon the application of the Zeeman effect.

The aforementioned U.S. patent application Ser. No. 785,186 discloses several alternative embodiments utilizing the repetitively pulsed Q-switch mode of operation. In each of these concepts the resonant cavity input flow is continuous and an iodine atom absorption region is placed intracavity and colinear with the optical axis of the laser. The absorption regions are configured with solenoids, i.e, coils of wire that produce magnetic fields therein which are parallel to the optical axis of the laser. When the magnetic field is off the absorption region counteracts the laser region and oscillation does not occur. In all of these concepts $O_2(^1\Delta)$, i.e., oxygen, and $I_2$, iodine, are supplied continuously to the cavity region.

In the preferred embodiment of the Q-switched chemical laser disclosed in U.S. patent application Ser. No. 785,186, the absorbing iodine atoms are produced in a separate chemical oxygen-iodine generator. This absorption region is coupled directly to the chemical oxygen-iodine gain region. Repetitive pulse operation occurs by first allowing the gain region to fill with fresh media when the field is off. Once the extraction volume is filled, a fast rising current pulse is applied to the solenoids producing transparency in the absorption region. With the gain medium essentially stationary, a short duration high intensity pulse is then extracted from the gain region. The peak intensity and pulse width are determined by the concentrations of $O_2(^1\Delta)$ and iodine atoms.

In an alternate embodiment of the Q-switched laser disclosed in U.S. patent application Ser. No. 785,186, the iodine atoms are produced in a heated cell from thermal dissociation of $I_2$. The heated cell is configured with a solenoid that produces an axial magnetic field. The heated cell is then repetitively pulsed modulating the absorption and producing a train of laser pulses in the manner set forth above. In a further alternate embodiment of the Q-switched laser disclosed in U.S. patent application Ser. No. 785,186, the natural build-up and decay of the subsonic gain profile is utilized. The gain region is folded within the resonator through the absorption region. In the absorption region the subsonic flow passes through the solenoid field coils. When the gain is positive in the upstream section the absorption in the downstream section is reduced by applying a current pulse to the solenoid. Net gain is established in the resonator and the energy in the upstream section of the flow is extracted in a short duration laser pulse.

In each of the embodiments of a Q-switched laser discussed above, it is necessary to provide a pulsed power modulator circuit which is capable of providing pulses of high current and preferably having fast rise times and fall times through the magnetic field-forming coils or solenoids.

OBJECTS OF THE INVENTION

It is therefore an object of this invention to provide an improved pulsed power modulator circuit especially adapted for use with a repetitively pulsed Q-switched chemical laser.

It is another object of this invention to provide a pulsed power modulator circuit for a repetitively pulsed Q-switched chemical oxygen-iodine laser having a magnetic field forming solenoid in the absorption region of the cavity.

It is still a further object of this invention to provide a pulse power modulator circuit for a repetitively pulsed Q-switched chemical oxygen-iodine laser in which the pulse power waveform has fast rise and fall time characteristics.

It is an even further object of this invention to provide a pulsed power modulator circuit for a repetitively pulsed Q-switched chemical oxygen-iodine laser, which modulator circuit is economical to produce and which utilizes conventional, currently available components that lend themselves to standard mass production manufacturing techniques.

For a better understanding of the present invention, together with other and further objects thereof, reference is made to the following description taken in conjunction with the accompanying drawings and its scope will be pointed out in the appended claims.

DETAILED DESCRIPTION OF THE PREFERRED EMBODIMENTS

Figure 1:
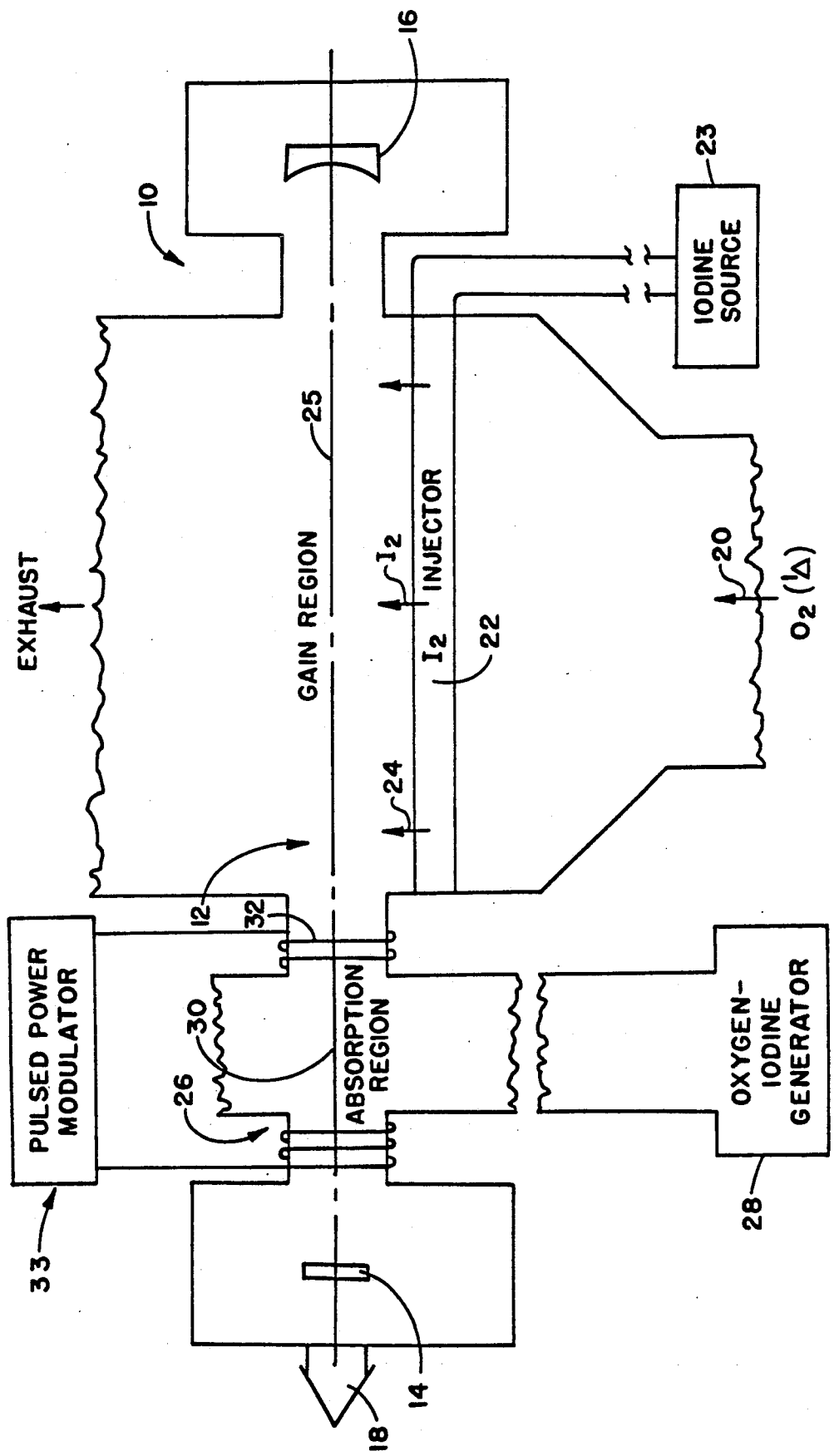
FIG. 1 is a schematic illustration of a repetitively pulsed Q-switched chemical oxygen-iodine laser.

Reference is now made to FIG. 1 of the drawings which represents schematically the laser 10 of the preferred embodiment of the invention disclosed in U.S. patent application Ser. No. 785,186. In laser 10 the resonant cavity 12 is depicted as having a pair of spaced apart mirrors 14 and 16, one of which, 14, is partially transmissive so as to enable the output of the laser beam 18 to pass therethrough. Oxygen, $O_2(^1\Delta)$, is continuously fed into the resonant cavity 12 from any suitable source (not shown) and as indicated by arrow 20. Iodine, $I_2$, is injected into the resonant cavity 12 by means of a conventional injector 22 connected to any suitable iodine source 23. Arrows 24 are indicative of the iodine flow. Within resonant cavity (or gain region) 12 the excited oxygen and iodine atoms combine to form the lasing or gain medium.

Laser 10 is operated in the repetitively pulsed mode. In this type of operation the extraction volume defined by the resonant cavity 12 is filled during the interpulse time with the thermally uniform gain medium. Once the optical mode volume is filled, laser action is triggered by reducing the threshold of the resonant cavity 12 by the use of a scaleable intracavity gas phase switch 26. The intracavity gas phase switch 26 defines an iodine absorption region situated within a pulsed magnetic field and is placed intracavity and colinear with the optical axis 25 of the resonant cavity 12. As illustrated in FIG. 1 of the drawings the absorbing iodine atoms are produced in a separate oxygen-iodine generator 28 by the interaction of molecular iodine and excited oxygen. From oxygen-iodine generator the absorbing iodine atoms are fed into the absorption region 30. The absorption region 30 has encompassed therearound a series of coils 32 that form a solenoid which, when energized produces a magnetic field which is parallel to the optical axis 25 of laser 10. A pulsed power modulator circuit 33 such as disclosed in detail later herein is interconnected to solenoid 32. When the magnetic field is off the absorption region 30 counteracts the laser gain and oscillation within the resonant cavity does not occur.

More specifically, for subsonic flow, cavity volumetric exchange times are in the order of milliseconds, whereas pulse extraction times due to the large magnitude of the $O_2(^1\Delta)/I$ transfer rate are on the order of microseconds. During the laser pulse the gain medium is essentially stationary with temporal density variations caused by the flux induced temperature rise occuring uniformly over the optical aperture. Thus, by operating subsonic in a repetitively pulsed mode the single most critical issue, that of medium quality and its effect on beam quality is eliminated. In addition, the short duration, high intensity pulses produced in this mode of operation may offer significant advantages in terms of propagation, target interaction effects, and the potential for frequency doubling when compared with lower average power CW operation. The peak power enhancements and repetitively pulsed mode of operation are a direct result of the relatively long radiative and collisional lifetimes of the $^2P_{\frac{1}{2}}$ state which permits efficient accumulation of energy within the cavity during the switch-off portion of the cycle.

The spin orbit states of atomic iodine are characterized by the spectroscopic term symbols $^2P_J$ with $J=\frac{1}{2}$ for the upper state and $J=3/2$ for the lower state. The quantum number J defines the electronic angular momentum of the atom. At the same time, the $^{127}I$ nucleus exhibits a nuclear spin of $I=5/2$. The total angular momentum vector (quantum number of the atom, F) is formed by the quantum mechanical vector addition of the quantum numbers J and I as follows:

$$F = I+J, I+J-1, \ldots I-J \qquad (1)$$

For the upper laser level $J=\frac{1}{2}$, there are then two possible values, $F=3,2$. For the lower laser level, however, there are four possible values, $F=4, 3, 2, 1$. The optical selection rules governing transitions between different hyperfine levels are given by $\Delta F=0, \pm 1$, and $\Delta M_F=0, \pm 1$. Six separate transitions are then possible. In the presence of a magnetic field, however, the degeneracies of the hyperfine energy levels are lifted and each is replaced by 2F+1 spatially quantized components according to the magnetic quantum number $M_F$. The dominant $F=3+4$ transition then splits into 21 components. The splitting of the levels causes a dilution of the level population densities. This effect, coupled to the lower transition moments computed for transitions between Zeeman components, relative to those observed for zero field transitions between hyperfine levels, forms the basis of the Q-switching approach to the repetitively pulsed operation of the chemical oxygen-iodine laser of the present invention.

During the field on phase of the switch cycle the absorption region 30 becomes largely transparent to the laser radiation and oscillations will occur, however, during the field off-phase, the absorption region 30 acts as a loss element which precludes oscillation, thereby allowing energy storage within the gain medium. The time between pulses is given by the ratio of extraction width, W, and flow velocity, V. The extraction width is limited by the width of the gain envelope, $W_{MAX}$. The minimum achievable pulse repetition frequency is then given by the following formula:

$$PRF_{MIN} = V/W_{MAX} \qquad (2)$$

Stated more succinctly, during operation, the oxygen, $O_2(^1\Delta)$, and iodine, $I_2$, are supplied continuously to the resonant cavity 12. The absorbing iodine atoms are produced in the separate oxygen-iodine generator 28 and fed into the absorption region 30 of the intracavity gas phase switch 26. The dwell time between the point of $I_2$ injection into the primary oxygen stream is made sufficiently long such that most of the atoms are in the absorbing $^2P_{3/2}$ state by the time the flow reaches the magnetic field region. The absorption region 30 is then coupled directly to the oxygen-iodine gain region 12 as shown in FIG. 1 of the drawings. Repetitive pulsed operation then occurs by first allowing the gain region to fill with fresh media with the field off. Once the extraction volume is filled formed by the fast rising current pulse formed by the pulsed power modulator 33 of the present invention is applied by means of field coils 32 to the absorption region 30. With the gain medium essentially stationary a short duration high intensity output pulse 18 is then extracted from the resonant cavity 12.

The peak intensity and pulse width are determined by the concentrations of $O_2(^1\Delta)$ in the iodine atoms. After the laser pulse 18 has been extracted, the magnetic field current is turned off and the resultant absorption prevents oscillation from occurring while the spent media is exhausted and fresh media enters the resonant cavity 12. The whole process is then repeated with a train of short duration high intensity pulses being extracted from the continous flow of oxygen and iodine within the resonant cavity 12 of laser 10.

Figure 2:
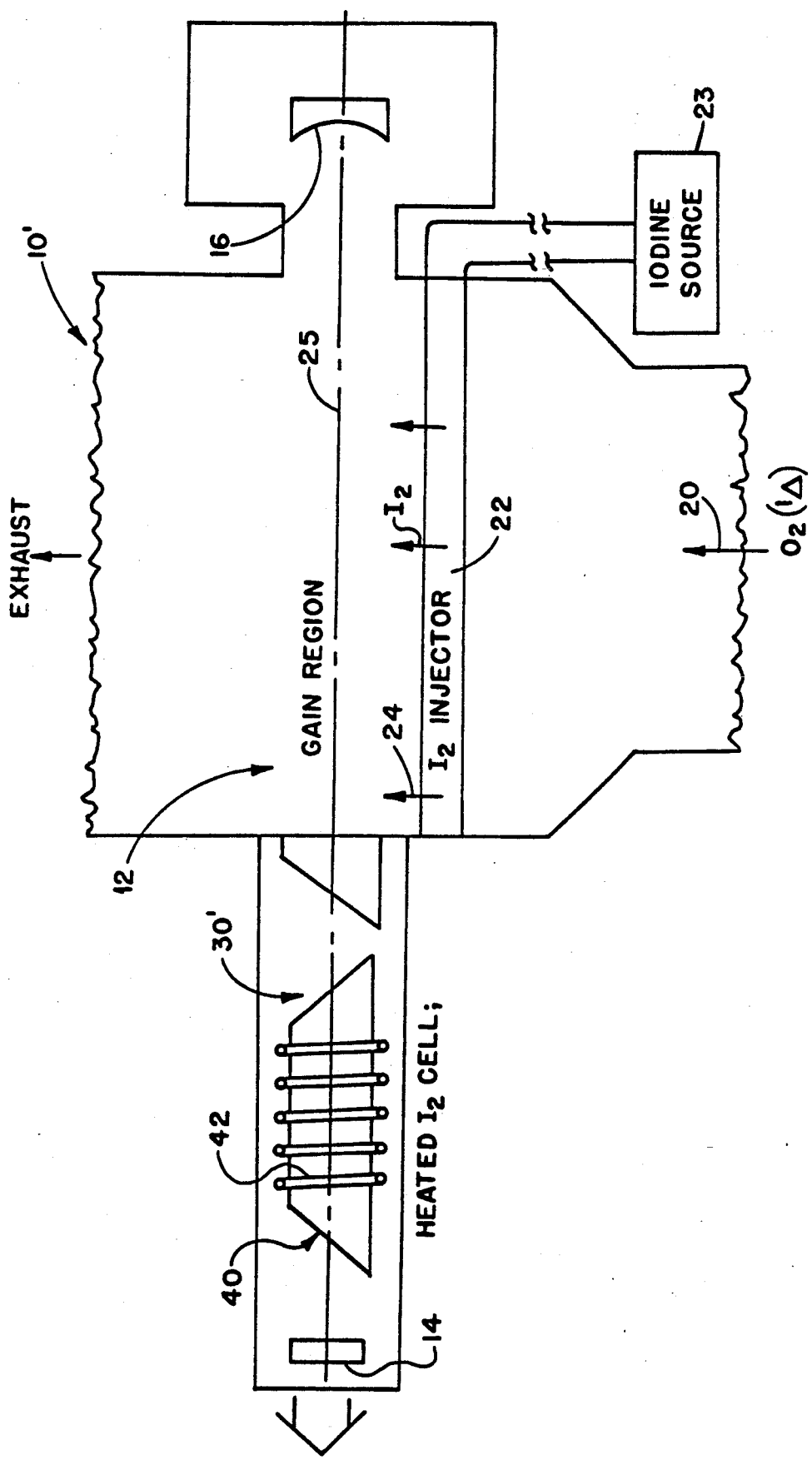
FIG. 2 is a schematic illustration of an alternate embodiment of a repetitively pulsed Q-switched chemical oxygen-iodine laser.

An alternative embodiment of the invention disclosed in U.S. patent application Ser. No. 785,186 is illustrated in FIG. 2 of the drawings. Since many of the components utilized with the laser 10' of FIG. 2 are the same as utilized with laser 10 like numerals will be utilized therein to represent identical elements to those found in FIG. 1 of the drawings. In FIG. 2' of the drawings the laser is represented by 10' and incorporates therein an iodine absorption region 30'. Within the embodiment of FIG. 2, a heated cell 40 is utilized to produce the iodine atoms through a conventional procedure of thermal dissociation of $I_2$ (molecular iodine). The heated cell 40 is configured with a solenoid 42 therearound which is coupled to the pulsed power modulator of the present invention to produce an axial magnetic field. The heated cell 40 is then repetitively pulsed modulating the absorption and producing a train of output laser pulses 18 as discussed with respect to the operation of laser 10 shown in FIG. 1 of the drawings.

Figure 3:
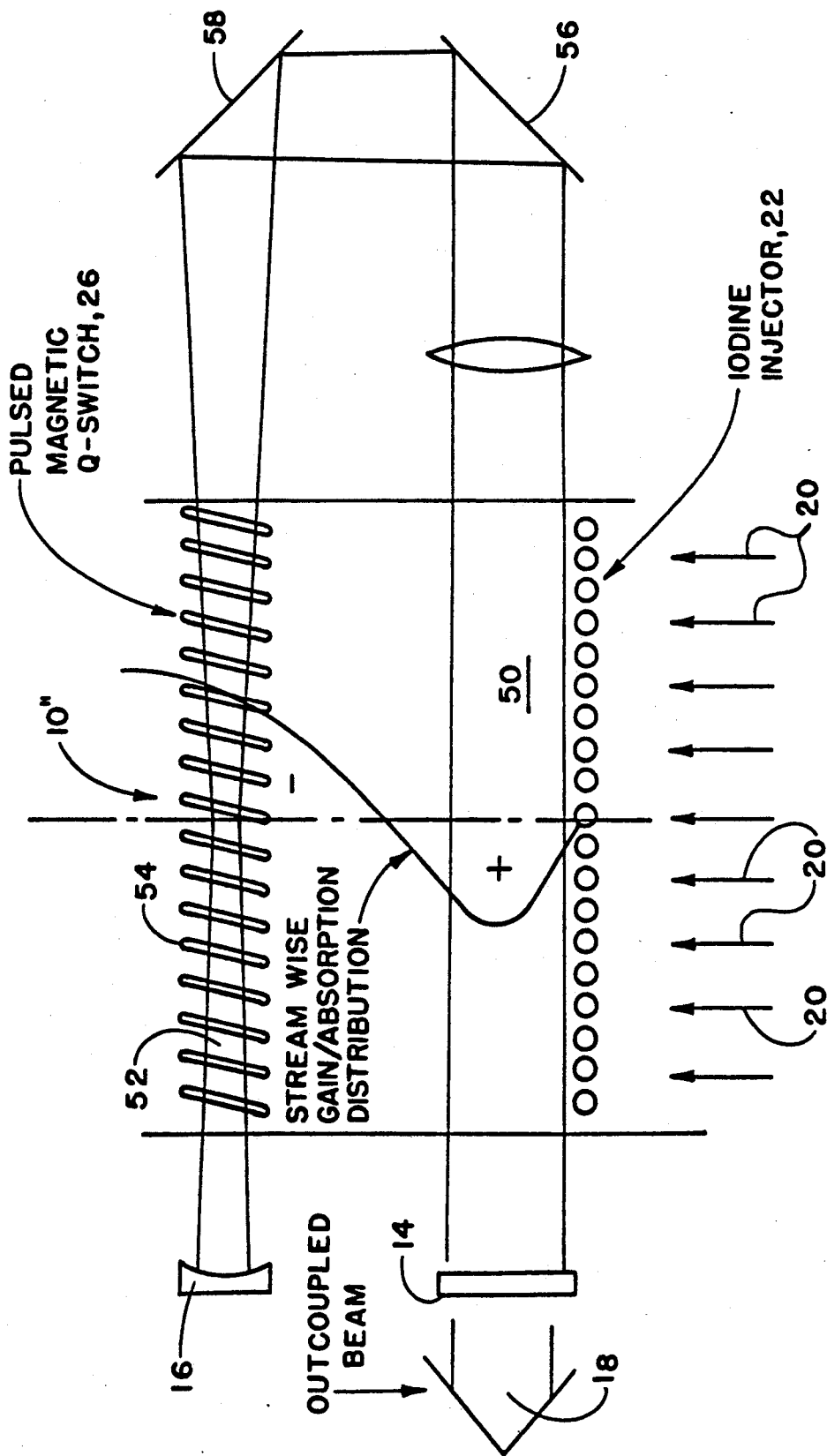
FIG. 3 is a schematic illustration of a further alternate embodiment of a repetitively pulsed Q-switched chemical oxygen-iodine laser.

A further alternate embodiment of the invention disclosed in U.S. patent application Ser. No. 785,186 is depicted schematically in FIG. 3 of the drawings. In the configuration set forth in FIG. 3 of the drawings, the natural build-up and decay of the subsonic gain profile is utilized. In FIG. 3 of the drawings the laser is denoted by numeral 10" and containing a gain or amplificaton region 50 and an absorption region 52. The gain region of 50 is folded through the absorption region 52. In the absorption region 52, the subsonic flow passes through a solenoid 54. When the gain is positive in the upstream section, the absorption in the downstream section is reduced by applying a current pulse to solenoid 54. Net gain is established in the resonator bounded by mirrors 14 and 16 and mirrors 56 and 58 similar to the operation of lasers 10 and 10' and the energy in the upstream section of the flow is extracted in a short duration laser pulse 18. The gain and absorption region 50 and 52, respectively, are then refilled and then the whole process is repeated similar to the operation of lasers 10 and 10' in FIGS. 1 and 2, respectively, of the drawings.

All of the three embodiments of the Q-switched chemical laser involve the use of a scaleable gas phase magnetic switch based on the Zeeman effect in atomic iodine. In all three cases a train of short duration high intensity pulses are extracted from a continuous flow of oxygen and iodine by modulating intracavity atomic iodine absorption with a magnetic field.

Figure 4:
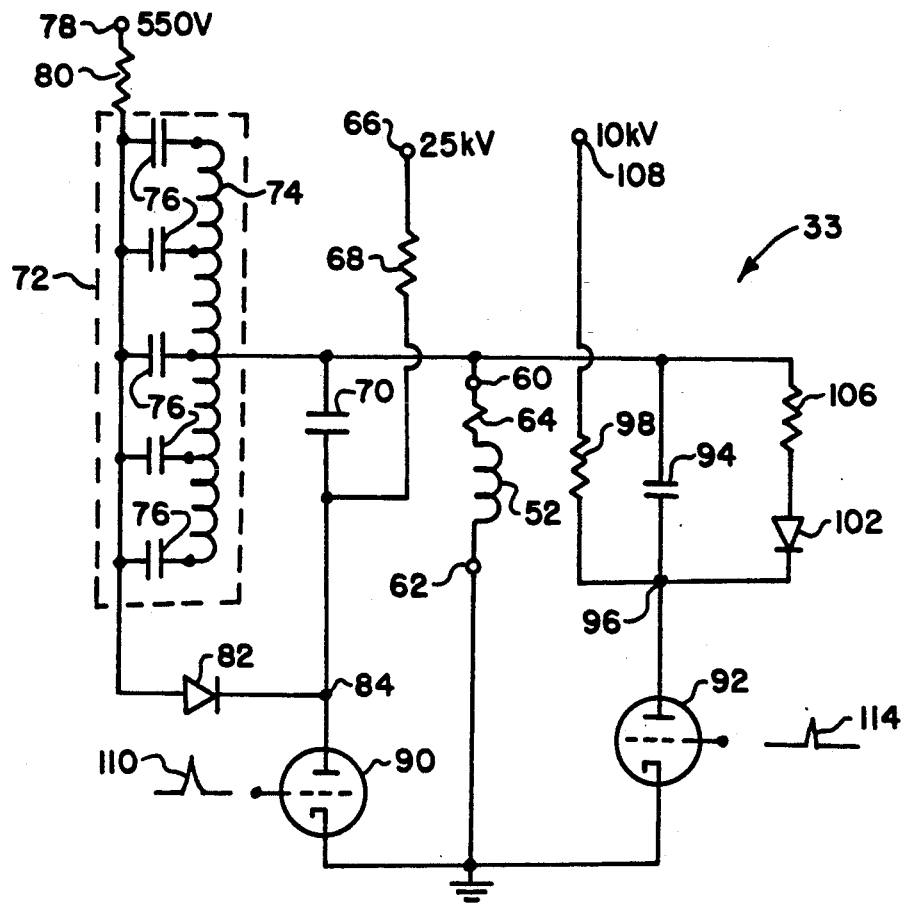
FIG. 4 is a schematic diagram of the pulse power modulator of the present invention.

FIG. 4 illustrates the preferred embodiment of the pulsed power modulator circuit 33 of the present invention, which provides high current switching pulses having fast rise and fall times to the magnetic field producing solenoids 32, 42 and 52 of the Q-switched chemical lasers described herein.

It is known that the rate at which a current changes in an inductor, such as the solenoids 32, 42 and 52 herein, is proportional to the voltage applied thereacross. Therefore, in order to cause a current to rise (or fall) to a given level corresponding to a change of Di in a time interval Dt, a voltage Vt equal to L times Di/Dt must be applied for a time Dt. Once the desired current is reached, however, the applied voltage need only be held at a value equal to the current times the DC resistance of the inductor for whatever time period it is desired to sustain the current level. To force the current back to zero rapidly, an overvoltage must be applied across the inductor in the reverse direction.

The pulse power modulator circuit shown in FIG. 4 accomplishes the high current-high switching speed parameters required in the Q-switched laser applications discussed herein. A magnetic field producing solenoid, such as solenoid 52, for example, is attached across output terminals 60 and 62 of the modulator circuit. A typical solenoid 52 may have an inductance of 65 microhenries and an internal DC resistance 64 of 0.7 ohms. A high voltage of 25 kilovolts is applied to a voltage terminal 66, and is coupled to solenoid 52 via a series connected resistor 68 and capacitor 70. Capacitor 70, which may have a value of 0.01 microfarads, charges to 25 kilovolts and provides the overvoltage drive to force a current of over 300 amperes through solenoid 52 in a time interval of about one microsecond.

The pulse power modulator circuit also includes a pulse forming network 72 which in a preferred embodiment of the invention comprises a thirty six turn coil 74 of five centimeters in diameter and fifty centimeters in length. Coil 74 is tapped along its length to form fourteen sections, only four being shown, and a capacitor 76 of 2.2 microfarads is coupled between each tap of coil 74, and thence to a voltage terminal 78 via a resistor 80, and also to the anode of a diode 82. Voltage terminal 78 has a voltage of 550 volts applied thereto. The center of coil 74 is coupled to solenoid 52 at output terminal 60, while the cathode of diode 82 is coupled to the junction 84 of capacitor 70 and resistor 68. The cathode of diode 82 is also coupled to the plate of a thyratron switch 90. The cathode of thyratron switch 90, output terminal 62 and the cathode of a second thyratron switch 92 are each coupled to a common or ground reference terminal.

Pulse forming network 72 is matched to the DC resistance (0.7 ohms) of solenoid 52 and is used to sustain the current through solenoid 52 for the desired pulse width of fifty microseconds.

A capacitor 94 of 0.01 microfarads is connected to solenoid 52 at output terminal 60 and has its other lead coupled to the common junction 96 of one lead of a resistor 98, the anode of thyratron switch 92, and the cathode of a diode 102. The anode of diode 102 is coupled to output terminal 60 via a resistor 106, and the other lead of resistor 98 is coupled to a voltage terminal 108 which has a voltage of 10 kilovolts applied thereto.

Capacitor 94 is charged to about 10 kilovolts and provides the drive to force the current through solenoid 52 back to zero, also in about one microsecond. A novel feature of this circuit is that the major portion of the energy used to drive the current through solenoid 52 back to zero is provided by the energy stored in solenoid 52. The energy stored in capacitor 94 is required only to provide an initial back bias on thyratron switch 90. The ratio of the energy stored in capacitor 94 to the amount required to terminate the current through solenoid 52 is in proportion to the square of the initial voltages on capacitors 94 and 70 which is about 0.15, i.e., only 15 percent of the pulse termination energy is provided from capacitor 94, the rest being provided from the stored energy in solenoid 52 which initially came from capacitor 70.

The operation of the pulse power modulator circuit 33 is initiated when a trigger pulse 110 is applied to the grid of thyratron switch 90 to cause it to conduct. Capacitor 70 which is charged to 25 kilovolts then forces current of about 310 amperes through solenoid 52 in about one microsecond. At this point in time, the voltage across capacitor 70 has fallen below the 550 volts to which pulse forming network 72 is charged. Diode 82 now conducts and pulse forming network 72 sustains the 310 amperes through solenoid 52 for a 50 microsecond time interval.

At the end of the 50 microsecond sustaining current pulse provided by pulse forming network 72, a trigger pulse 114 is applied to the grid of thyratron switch 92 to cause it to conduct. The 10 kilovolts existing across capacitor 94 back biases thyratron switch 90 and forces it to turn off. It also forces the 310 ampere current to a slightly higher level for about 0.15 microseconds. At this point in time, the voltage across capacitor 94 has fallen to zero and the energy stored in solenoid 52 begins transferring into capacitor 94 and causes the voltage on capacitor 94 to reverse towards a peak value of about 26.5 kilovolts. This voltage reversal forces the current in solenoid 52 to zero in about one microsecond. The current in solenoid 52 now attempts to reverse direction which back biases thyratron switch 92 and causes it to turn off thereby clamping the current through solenoid 52 to zero.

Figure 5:
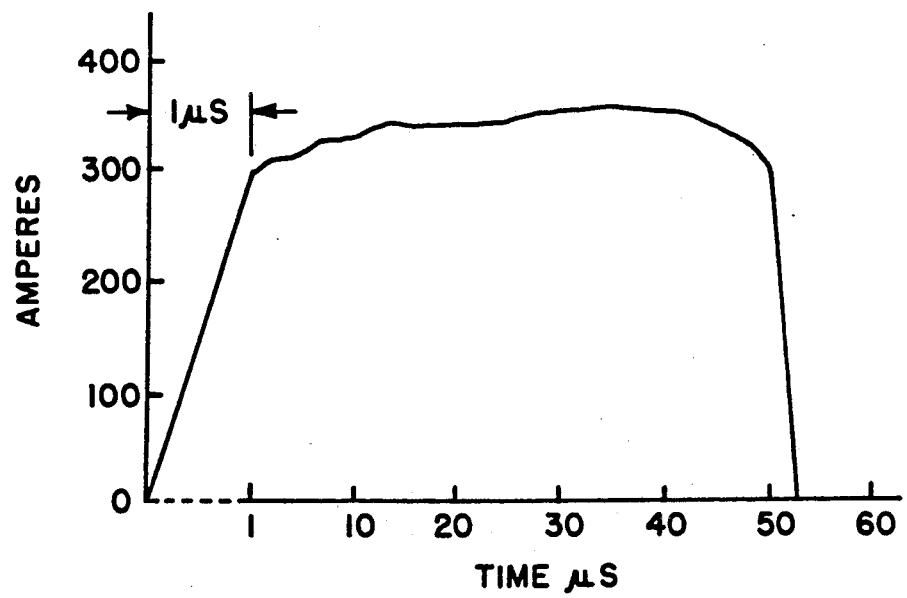
FIG. 5 is a graph illustrating the current switching time waveform provided by the present invention.

FIG. 5 is a graph depicting the current versus time response of the current applied through solenoidal coil 32 by the pulse power modulator circuit of the present invention. The time scale of the graph has been expanded between zero and one microsecond to better illustrate the rise time of the current through the magnetic field forming solenoid.

Although this invention has been described with reference to particular embodiments, it will be understood that this invention is also capable of further and other embodiments within the spirit and scope of the appended claims.

I claim:

1. In a Q-switched chemical laser, a pulsed power modulator apparatus for establishing a current pulse of high intensity and having fast rise and fall times through a magnetic field forming solenoid, said pulse power modulator apparatus comprising:

first and second pulse output terminals;

pulse initiating means for initiating the rapid rise of a current pulse to a predetermined current intensity through a solenoid coupled across said first and second pulse output terminals, said pulse initiating means comprising a first capacitor, means for charging said first capacitor to a first voltage level, and a first switch for coupling said first capacitor across said first and second pulse output terminals;

pulse sustaining means for sustaining said current pulse at said predetermined current intensity through said solenoid for a predetermined time interval, said pulse sustaining means comprising a pulse forming network, means for charging said pulse forming network to a second voltage level lower than said first voltage level, and means including a first diode for coupling said pulse forming network across said first and second pulse output terminals;

and pulse terminating means for rapidly terminating said current pulse at the end of said predetermined time interval, said pulse terminating means comprising a second capacitor, means for charging said second capacitor to a third voltage level, and a second switch for coupling said second capacitor across said first and second pulse output terminals.

2. An apparatus as defined in claim 1 wherein said pulse forming network of said pulse sustaining means further comprises a plurality of serially connected inductor sections each having a shunt capacitor coupled therefrom to the anode of said first diode, an intermediate one of said inductor sections being coupled to said first pulse output terminal and wherein said cathode of said first diode is coupled to said second pulse output terminal through said first switch.

3. An apparatus as defined in claim 2 wherein said pulse terminating means further comprises a resistor and a second diode connected in series across said second capacitor, said second diode having its anode connected to said resistor and having its cathode connected to said second switch.

4. An apparatus as defined in claim 3 and further comprising means for applying an output pulse initiating signal to said first switch and an output pulse terminating signal to said second switch.

5. An apparatus as defined in claim 4 wherein said first switch and said second switch are each a thyratron.

* * * * *